Patented July 2, 1935

2,006,507

UNITED STATES PATENT OFFICE 2,006,507

MANUFACTURE OF FIBROIN SALT SOLUTIONS

Herbert Mahn and Wilhelm Irion, Dessau in Anhalt, Germany, assignors to I. G. Farbenindustrie Aktiengesellschaft, of Frankfort on the Main, Germany No Drawing. Application February 15, 1932, Serial No. 593,196. In Germany February 23, 1931

9 Claims. (Cl. 134—1)

Our present invention relates to the manufacture of fibroin salt solutions.

One of its objects is to provide a process of manufacturing such solutions having a reduced viscosity. Another object are these new solutions. Further objects will be seen from the detailed specification following hereafter.

In the preparation of concentrated fibroin-salt solutions, very highly viscous and non-homogeneous solutions are frequently obtained, particularly when a highly valuable albuminous material is used, which is dispersed under mild conditions. When highly concentrated aqueous salt solutions are used for the dispersion, a fibroin-salt adsorption compound may even separate.

For practical use the attempt is made, on the one hand, to prepare solutions of a fibroin content as high as possible, and on the other hand, to keep the viscosity as low as possible without incurring the risk of degradation.

According to our invention a sufficiently high concentration of the fibroin solution and, at the same time, a good homogeneity and an average viscosity of the solution are obtained without a noteworthy degradation, by adding to the salt solution either before, during or after the dispersion of the fibroin, an acid amide. Suitable acid amides are formamide, acetamide, propionamide, malonamide, succinimide, succinimide, urea or the like. The solutions of albuminous substance thus obtained in a dispersing salt solution are considerably less viscous, they flow better in the ducts and can more easily be filtered than fibroin solutions of the same concentration without the said additions. When no addition of an acid amide is made to the fibroin solution there will only be obtained solutions which are scarcely fluent or not fluent at all. However, on the addition of about 5 to 10 percent of an acid amide to these fibroin solutions, they show a viscosity of about 60 to 80 seconds measured in the ball viscosimeter (the viscosity means the time, a steel ball having a diameter of 3 mm. needs for falling through a column of 20 cm. height of the solution, the latter being kept at 20° C.).

The tendency of fibroin-salt adsorption compounds to separate from the fibroin solutions at high salt concentrations is removed; precipitates which have already formed can even be redissolved by addition of an acid amide; for instance the salt adsorption compounds obtained in the manner described in our copending application Serial No. 531,850 filed Apr. 21, 1931 can, after separation of the solvent, be liquefied by mixing them with an acid amide.

The following examples illustrate the invention:

Example 1.—50 cc. of formamide are added to 1000 cc. of an aqueous sodium thiocyanate solution saturated at 50° C. The solution is heated to 70° C.–75°. In the course of ½ minute 220 grams of degummed silk waste (blousses) are introduced and dissolved within 5 minutes, while vigorously stirring. The solution is then cooled to 30° C. in the course of 15–20 minutes and the impurities are eliminated by filtration. The solution is used, preferably after separation of the salt by dialysis, for the preparation of spinning solutions or plastic masses. Instead of 50 cc. of formamide, there can be added to the salt solution other acid amides, for instance 100 grams of urea. By working in the same manner, without addition of an acid amide, a paste is obtained which does not flow.

Example 2.—A paste prepared by introducing at about 45° C. 100 grams of natural silk wastes (blousses) into about 4 kilos of an aqueous solution of NaSCN saturated at 50° C. while well kneading for about ½ hour, and containing 14 per cent. of fibroin, 54 per cent. of sodium thiocyanate and 32 per cent. of water, is mixed at ordinary temperature with 8 per cent. of formamide. A liquid, homogeneous solution is obtained.

Example 3.—1000 cc. of an aqueous solution of sodium rhodanate of about 65 per cent strength are mixed with about 100 cc. of formamide or 120 grams of urea. 200 grams of silk wastes (blousses) are introduced in this solution at a temperature of about 35° C., care being taken that the fibrous mass is uniformly wetted by the salt solution. In the course of an hour the silk is dissolved while stirring occasionally at the beginning of the operation and continually towards its end. It is advantageous to let the solution stand for some hours at about 25° C., in order to increase its homogeneity. Hereafter the solution is filtered and dialysed, and is then fit for use in the production of artificial threads or plastic masses.

Example 4.—110 cc. of formamide or 130 grams of urea are added to 1000 cc. of an aqueous solution of sodium rhodanate of about 68 per cent. strength. In this solution heated to about 25° C., there are introduced about 200 grams of silk wastes in such a manner that the fibrous mass is uniformly wetted. The mixture of silk and salt solution is thoroughly stirred and kneaded as soon as the silk fibers have begun to soften. The silk is dissolved within 4 to 5 hours. The solution is allowed to stand 5 to 10 hours before its filtration, in order to increase its homogeneity. The further working up is the same as described in the foregoing examples.

Our invention is not limited to the foregoing examples nor to the specific details given therein. Other amides than those mentioned will give the same effect. The quantity of amide added to the solution is not unlimited, but will depend upon the relations of solubility. As a rule larger quantities than 15 per cent. of acid amide will not be used. The quantity of acid amide and the special kind of acid amide to be added in order to obtain the best result can in each base be determined by a few simple comparative experiments.

What we claim is:—

1. The process of manufacturing an aqueous fibroin-salt solution which comprises adding 100 grams of urea to about 1000 cc. of an aqueous solution of sodium thiocyanate saturated at 50° C., heating this solution to about 70 to 75° C., introducing in said heated solution 220 grams of silk waste within about ½ minute while vigorously stirring and cooling the resulting mixture to 30° C.

2. The process of manufacturing an aqueous fibroin solution which comprises adding 130 grams of urea to 1000 cc. of an aqueous solution of sodium rhodanate of about 68 per cent. strength, introducing into said sodium rhodanate solution about 200 grams of silk wastes at a temperature of about 25° C. and stirring the resulting mixture until a homogeneous solution is obtained.

3. The process of manufacturing an aqueous fibroin-salt solution which comprises preparing a paste containing about 14 per cent. of fibroin, 54 per cent. of sodium thiocyanate and 32 per cent. of water by introducing at about 45° C. 100 grams of natural silk wastes into about 4 kilos of a solution of NaSCN saturated at 50° C., and mixing said paste at ordinary temperature with about 8 per cent. of formamide.

4. A composition of matter comprising an aqueous fibroin-salt solution and an acid amide.

5. A composition of matter comprising an aqueous fibroin-salt solution and an acid amide said acid amide being present in an amount of not more than 15 per cent.

6. In the process of manufacturing aqueous fibroin-salt solutions by dissolving fibroin in an aqueous salt solution, the step which comprises adding an acid amide to the aqueous salt solution at any stage of the preparation of the fibroin solution.

7. In the process of manufacturing aqueous fibroin-salt solutions by dissolving fibroin in an aqueous salt solution, the step which comprises adding an acid amide in an amount of at most 15% to the aqueous salt solution at any stage of the preparation of the fibroin solution.

8. A composition of matter comprising an aqueous solution of fibroin, sodium thiocyanate and urea.

9. A composition of matter comprising an aqueous solution of fibroin, sodium thiocyanate and formamide.

HERBERT MAHN.
WILHELM IRION.